Figure 1:
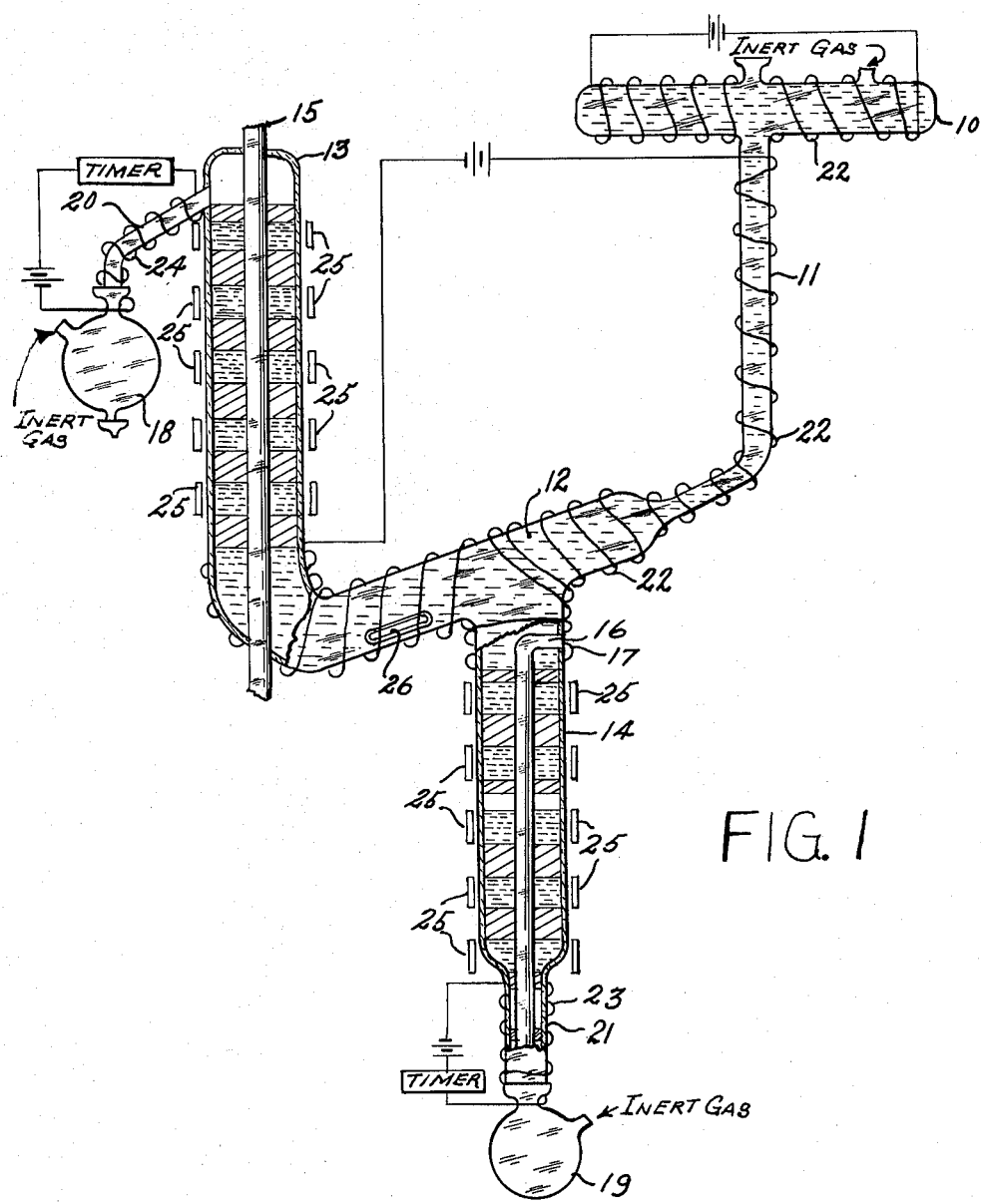

INVENTORS
GUY H. MOATES AND
WALTER B. JACKSON
BY JOHN K. KENNEDY

ATTORNEYS

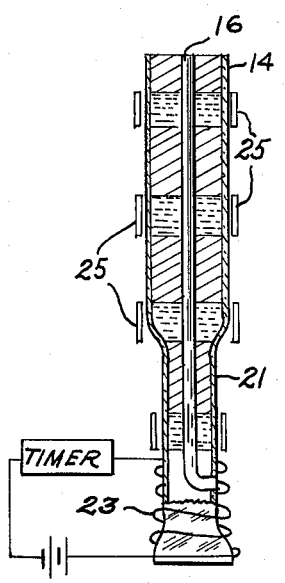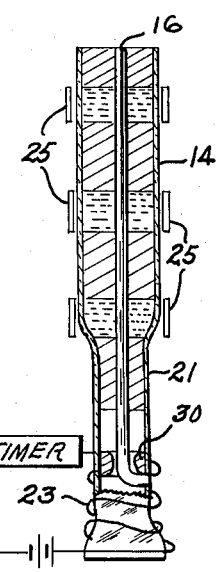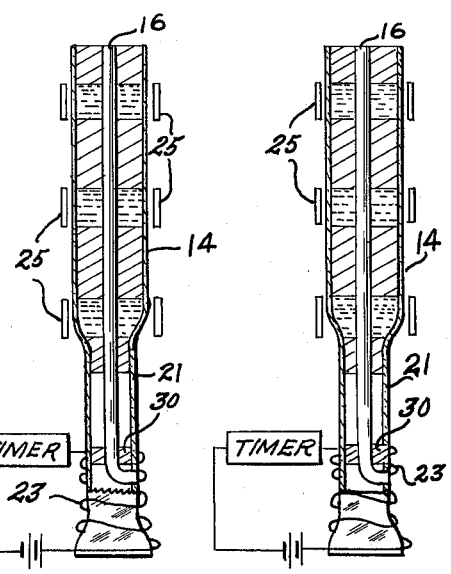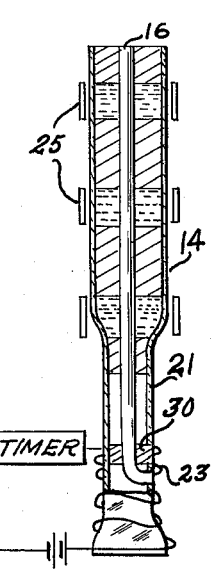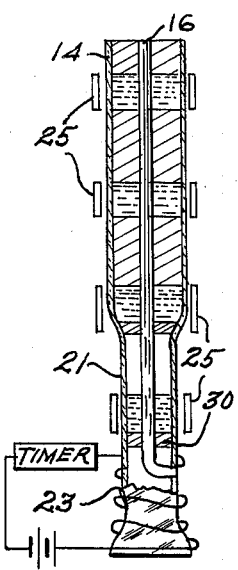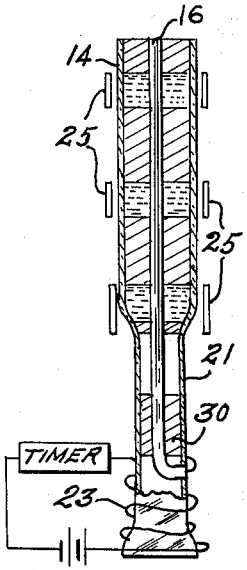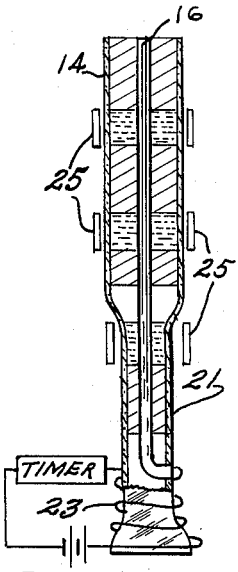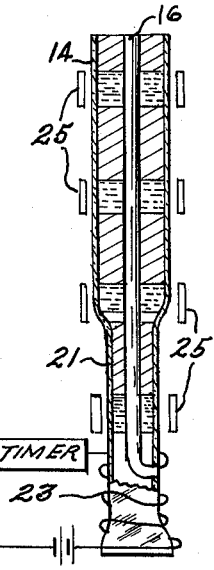
FIG.2A  FIG.2B  FIG.2C  FIG.2D
FIG.2E  FIG.2F  FIG.2G  FIG.2H
INVENTORS
GUY H. MOATES AND
WALTER B. JACKSON
BY JOHN K. KENNEDY
ATTORNEYS

INVENTORS
GUY H. MOATES AND
WALTER B. JACKSON
BY JOHN K. KENNEDY

ATTORNEYS

March 29, 1966 GUY H. MOATES ETAL 3,243,266
CONTINUOUS MULTI-STAGE VOID DIFFERENTIAL-DENSITY
HYBRID ZONE MELTING
Filed Jan. 6, 1961 6 Sheets-Sheet 6

INVENTORS
GUY H. MOATES AND
WALTER B. JACKSON
BY JOHN K. KENNEDY

ATTORNEYS

United States Patent Office 3,243,266
Patented Mar. 29, 1966.

3,243,266
CONTINUOUS MULTI-STAGE VOID DIFFERENTIAL-DENSITY HYBRID ZONE MELTING
Guy H. Moates, U.S. Air Force, and Walter B. Jackson, Waltham, and John K. Kennedy, Boston, Mass., assignors to the United States of America as represented by the Secretary of the Air Force
Filed Jan. 6, 1961, Ser. No. 81,203
8 Claims. (Cl. 23—301)

The invention described herein may be manufactured and used by or for the United States Government for governmental purposes without payment to us of any royalty thereon.

This invention relates generally to the purification of chemical elements or compounds, and more particularly to the purification thereof by utilizing the effect of causing a separation of the impurities as a result of the density differential between insoluble impurities and the liquid solvent in a continuous, multistage, zone melting apparatus.

Zone melting has been investigated thoroughly as a means for purification of materials for the semiconductor field. In a prior application Serial No. 817,688, filed June 2, 1959, of which we were of the joint inventors, a zone-void purification apparatus was described. The instant invention utilizers part of the zone-void process in addition to a density difference phenomenon. By eliminating the voids in the enriching section and utilizing the aforementioned phenomenon, volatile impurities are separated from the purified solvent.

Accordingly, it is an object of this invention to provide a novel method that allows for preparing of ultra pure materials.

Another object of this invention is to present an apparatus which utilizes the movement of solvent along a tube by the differential density phenomenon.

It is still another object of this invention to provide a purification apparatus having a hollow glass tube in the center of the enriching arm of the apparatus to provide for improved zone control and to allow for increased product output.

It is a further object of this invention to provide a purification apparatus which allows for the separation of insolubles by gravity differences.

It is a still further object of this invention to provide a continuous purification system which may be operated either vertically, horizontally or with a combination of vertical and horizontal sections.

Another object of this invention provides for the production of pure chemical elements or compounds wherein impure vapors are prevented from contaminating purified solvent.

Still another object of this invention involves the provision of a continuous purification system having an efficient means for mixing rejected material from the enriching and stripping sections with the feed material such that the feed has a substantially constant concentration of pure and impure materials.

Figure 3:
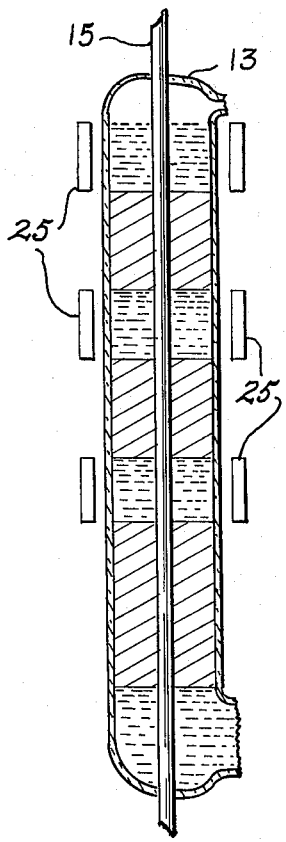
Figure 3:
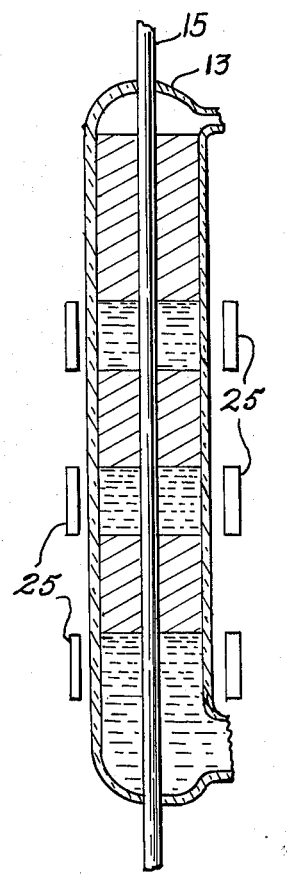
Figure 3:
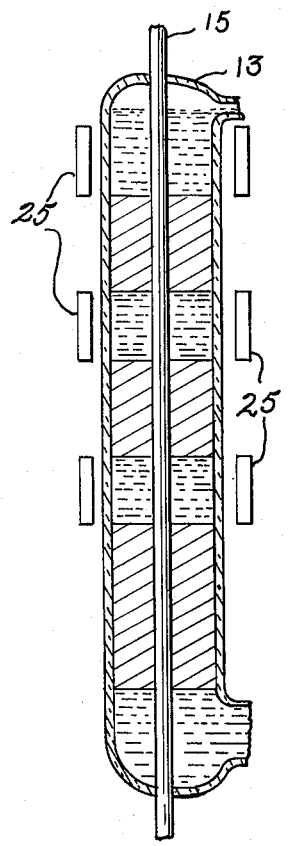
Figure 4:
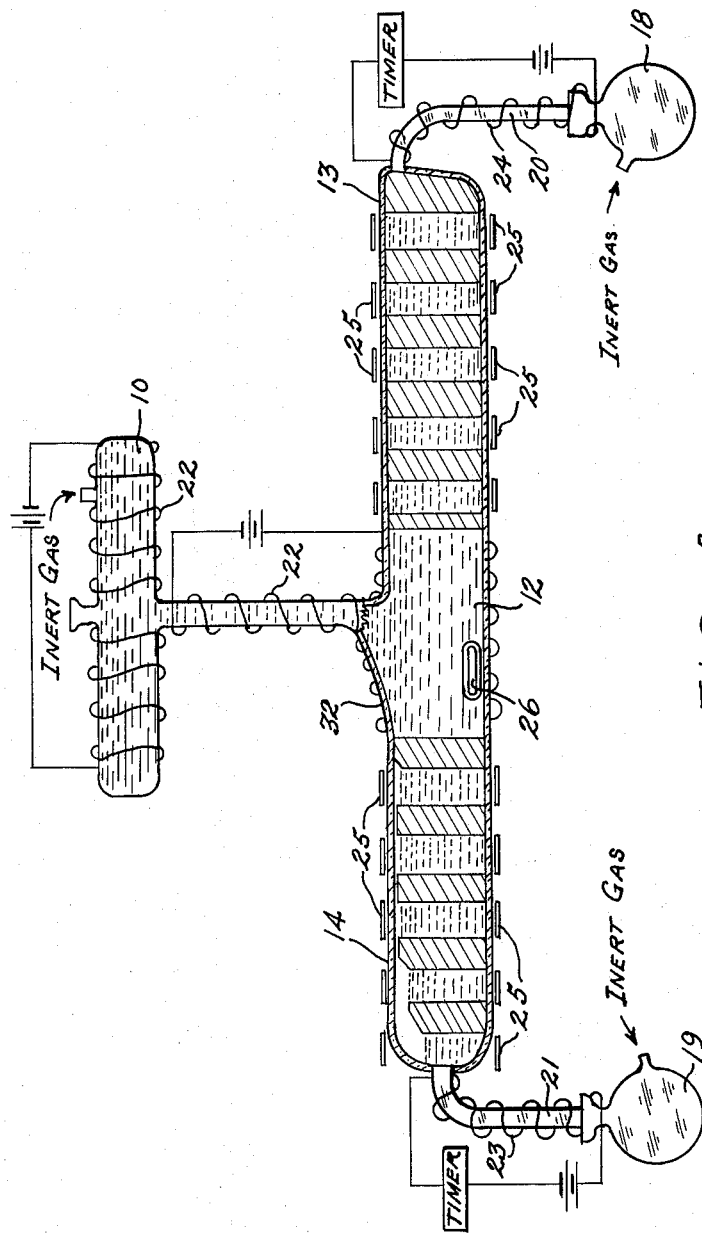
Figure 5A:
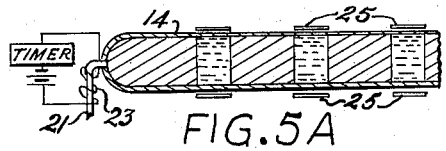
Figure 5I:
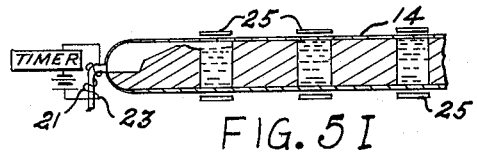
Figure 5B:
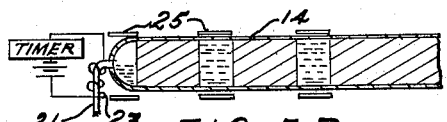
Figure 5J:
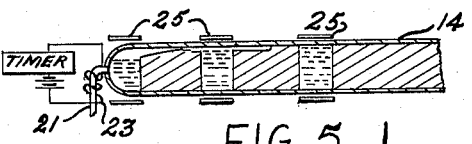
Figure 5C:
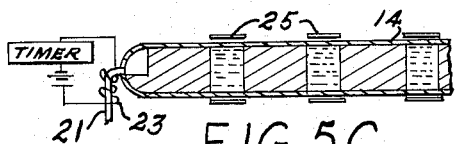
Figure 5K:
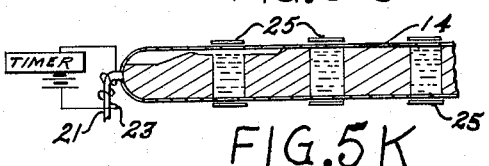
Figure 5D:
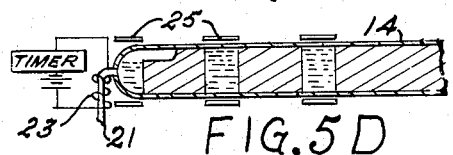
Figure 5L:
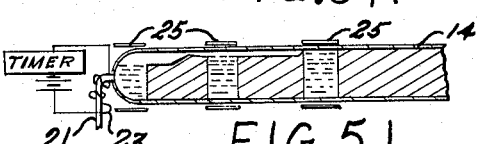
Figure 5E:
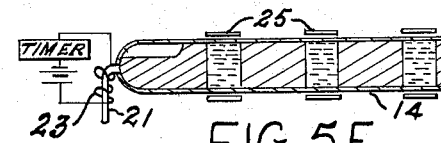
Figure 5M:
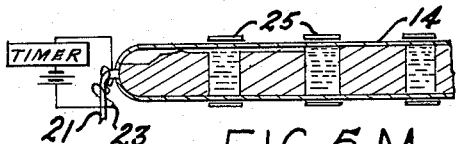
Figure 5F:
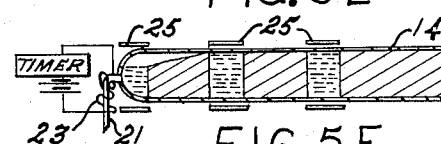
Figure 5N:
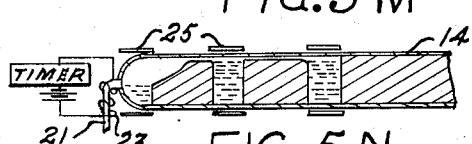
Figure 5G:
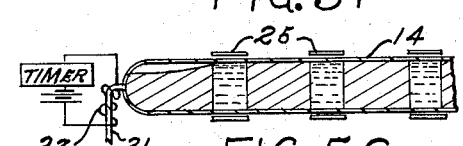
Figure 5O:
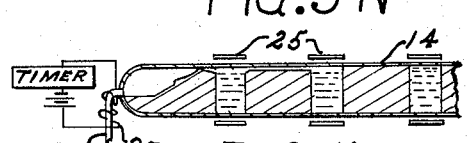
Figure 5H:
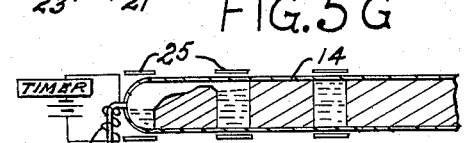
Figure 5P:
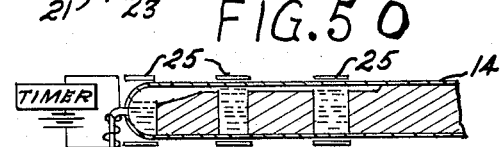
Figure 6:
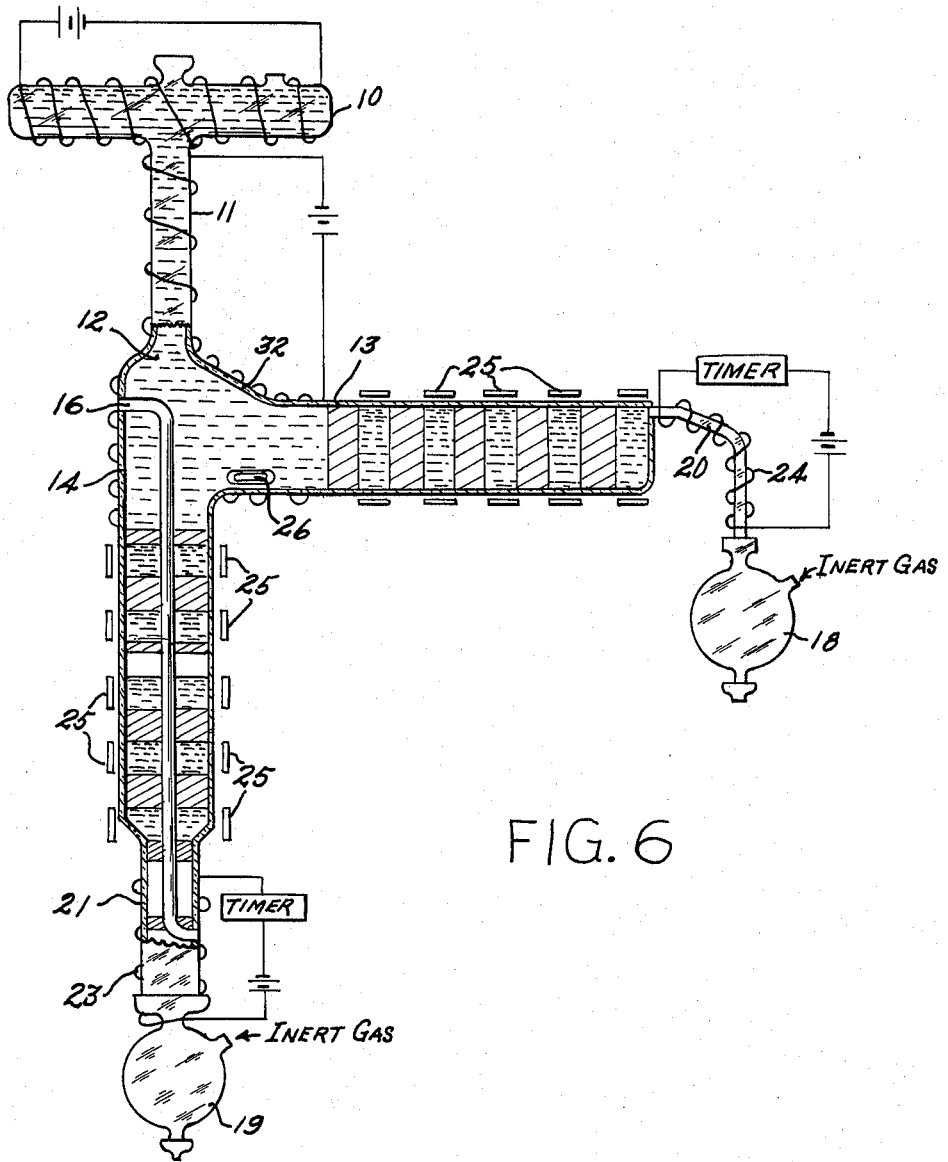

These and other advantages, features and objects of the invention will become more apparent from the following description taken in connection with the illustrative embodiments in the accompanying drawings, wherein:

FIGURE 1 is a schematic representation of a vertically offset arrangement for purifying chemical elements or compounds;

FIGURE 2 A through H are schematic representations illustrating the action of the void former in the vertical stripping sections;

FIGURES 3 A through C illustrate schematically the density differential phenomenon as applied to the continuous process of this invention;

FIGURE 4 is a schematic representation of a horizontal purification apparatus;

FIGURES 5 A through P are schematic representations of the various stages of the operation of the horizontal stripping section; and FIGURE 6 is a representation of purification apparatus having a horizontal enriching section and a vertical stripping section.

The principle of the continuous zone melting as described in the aforementioned patent application depends upon the collection of purified product from one end of a vertical column, collection of impure waste from the bottom of one end of a second vertical column, and the injection of feed material from a feed hopper secured to the top ends of said columns. By operating the apparatus described in application Serial No. 817,688, voids are created at the bottom ends of each of the columns and allows for material to be fed into the columns when the void reaches the said hopper. This system allows contamination by artificial supercooling or by physical entrapment of unpurified solvent in striations. In addition, vapor pressure problems allow for the contamination of purified solvent by impure vapors.

The method and apparatus of the system of this invention utilizes the difference in density or specific volumes of the solid and liquid phases of the solvent. This differential density phenomenon or matter transport causes solvent to move in a direction opposite to that of zone movement where the density of the solid is greater than the density of the liquid.

FIGURE 1 shows a feed hopper 10 connected with a vertical feed tube 11 which in turn is connected to an intermediate zone or feed chamber 12 for providing impure material to be refined. Vertical enriching tube 13 and stripping tube 14 are connected with the intermediate zone 12 and are offset from each other. The enriching section 13 has a tube 15, preferably hollow, although it may be solid, extending through its center. A tube 16 is also provided for the stripping section 14 and is secured to or extends through the side of the tube 14 at 17 and also is similarly fastened to void former 21. Tubes 15 and 16 may be omitted from the device; however, this addition enables improved cooling, larger apparatus, and improved zone geometry. These tubes are approximately 20–40 percent of the diameter of the tubes in which they are located. Product receivers 18 and 19 are provided for receiving the purified product and waste from the enriching and stripping sections, respectively. The product flask 18 is connected with the enriching section by means of a feed tube 20 which is connected from the top portion of the enriching tube 13 to the flask. The waste flask 19 is connected with the necked-down portion 21 at the bottom of the stripping tube 14 wherein the voids for this section are formed. Each flask and the feed hopper 10 has an inlet for an inert gas such as argon. The feed unit 10, 11, 12 is lagged or heated by means of heating tape 22 wound around these elements (as shown schematically in FIGURE 1). It should be understood that although particular types of heating means are described relative to this invention, other types of heaters may be utilized. Heating tape is provided at the void forming section 21 and at tube 20 and are designated as 23 and 24, respectively. Heating elements 23 and 24 are each connected to timers, indicated schematically on FIGURE 1, which are operated as described infra. Molten zones in the enriching and stripping sections are created by the heat resulting from wattage built up when a current is passed through Nichrome wire heaters which are wrapped about heat treated lava forms. These heaters are shown schematically at 25 and would be connected in parallel.

The movement of these heaters is continuous as a result of a reciprocating motion effected by a cam mechanism such as that described in application Serial No. 700,924, filed Dec. 5, 1957, by Walter B. Jackson. A soft iron magnet material 26 which is coated with a non-contaminating material such as Teflon or quartz is actuated by means of an exterior magnet (not shown), to move it to and fro in order to mix mechanically the material in the intermediate zone feed chamber.

With the density of the solid greater than the density of the liquid phase, a segregation coefficient greater than 1, and with zone lengths maintained equal, the solvent travel due to differential density is approximately the zone length multiplied by the ratio of the densities of the solid and liquid phases; therefore, the amount of material collected at the product end of the tube 13 after each cycle is approximately equal to the zone length multiplied by the ratio of the densities of the solid and liquid multiplied by area of the cross section of the zoning tube and multiplied by the density of the material in the liquid state. The utilization of these principles is explained relative to the embodiment of FIGURE 1 in subsequent paragraphs.

After purging the equipment, material is fed in from the hopper 10 until all sections of the device are full. This is done by allowing the material to solidify in tubes 20 and 21. Simultaneously the heaters 25 maintain molten zones at the heater's sites. As soon as tubes 13 and 14 are filled the reciprocating motion drive, which causes heater movement in the same direction, is turned on and causes the heaters 25 which are separated by a fixed zone distance to travel at a given rate of speed in a downward direction. At the end of a cycle of one zone the heaters immediately reciprocate to their original position and the sequence is repeated indefinitely thereby causing the molten zones to pass continuously down to the length of the charge. During operation of the device, the feed section material is kept in a molten state. The exit tube or void former 21 for the stripping section 14 has its heater 23 operated by a timer to operate every third cycle while the product tube 20 is operated a few minutes prior to and after the end of each cycle.

FIGURES 2 A through H illustrate the formation of voids and the transfer of waste material in the stripping tube 14. In FIGURE 2A the furnaces or heaters 25 are at their positions after completing a cycle of movement with molten zones being shown adjacent to the heaters 25 and in the void section 21. In FIGURE 2B the heaters 25 have reciprocated between the end of a cycle and the beginning of the next cycle. The timer associated with the heating tape 23 is off in both FIGURES 2 A and B. Thus, the material melted from the bottom of the void former 21 solidifies from the cool walls thereof to form the beginning of a plug which is designated by the numeral 30. FIGURE 2C shows the movement of the zones downwardly along with heaters 25 to terminate the second cycle. At this point a solid plug 30 closes the entire void former section in the region of the heating tape 23 and a void immediately above the plug is formed equal to two zone lengths. At the beginning of the third cycle, FIGURE 2D, the heaters have moved to the position indicated. FIGURE 2E denotes the end of the third cycle and shows the movement of the void upwardly as a result of the filling in action of the material in the molten zone which has been carried down by the bottom most furnace. The height of the plug 30 is ready to be increased as shown by the addition of the molten zone above it. At the beginning of the fourth cycle FIGURE 2F, only a small portion of solidified material separates the zone in the main column from the void in the reduced diameter void former 21. This portion of solidified material is melted out the first few minutes of the fourth cycle and the molten material above it flows into the void former (FIGURE 2G), thus completely filling in the void former 21. The void is at this time transferred from the reduced diameter void former 21 to the main column 14.

The timer for heating tape 23 is actuated shortly after the termination of the third cycle and melts out the bottom portion of solidified material forming the plug 30 in the void former as shown in FIGURE 2G. The auxiliary heater or tape 23 now shuts off for another three cycles. FIGURE 2H illustrates the situation at the end of the fourth cycle and has conditions therein similar to that of FIGURE 2A with the exception that a void has started its movement up the stripping tube 14. The movement of the void up through the tube 14 is caused by an intermittent filling of the void section by successive melting zones above it. Waste product is provided by filling in the top void when it reaches the feed chamber 12. The ratio of void length to zone length may be regulated by the ratio of the diameter of void former 21 to main arm 14 diameter, the size of the zone carried through the void former, and the temperature of the tape provided to the void former 21. The offset arrangement of FIGURE 1 assures the entrance of the void to the feed hopper since this bubble tends to rise through the molten material.

The solvent movement in the enriching section 13 is caused by the density differential phenomenon noted heretofore. This effect does not take place in the stripping section 14 because the direction of movement of the void is from the waste flask 19 to the feed chamber 12 which negates the effect of the density differential phenomenon. Hence, the physical removal of the waste is employed at intervals and the voids are used for providing additional material from the feed chamber.

Gravity flow is eliminated from the enriching section since a continuous solid core or ingot of solvent is subjected to repeated downward passages of molten zones. FIGURES 3 A through C illustrate the movement of material carried by the passage of the heaters up the enriching tube 13. In FIGURE 3A a molten zone is created at the top of the charge causing a volume of the enclosed molten material to expand by a ratio proportional to the difference in densities of the solid and liquid phases. As the molten zone moves downward material freezes above the zone at the level of the expanded liquid volume (FIGURE 3B). The heaters descend and the bottom zone becomes continuous with the molten feed material in the feed chamber as shown in FIGURE 3B. After reciprocation, FIGURE 3C, solidification of the bottom zone results in an upward movement of feed material due to the difference in densities of the solid and liquid. This feed material solidifies with the result that there is a greater mass of solid material above the liquid feed at this time. This sequence is repeated with subsequent cycles of the heaters 25. The heating unit 24 for tube 20 (FIGURE 1) is controlled by its timer for a few minutes prior to the end of a cycle and is shut off a few minutes after the cycle, thereby allowing the expanded material at the top of enriching section 13 to flow into the product flask 18.

FIGURE 4 shows a horizontally disposed apparatus wherein the enriching and stripping sections lie in the same plane. The feed chamber 12 is connected with each of these sections as an extension thereof; however, an enlarged portion at 32 is provided to assure travel of the voids from the stripping section 14 into the feed hopper 10.

The movement of material in the stripping section 14 is described relative to FIGURES 5 A through D illustrating the sequence in the horizontal stripping section and the creation of voids therein. The movement of voids in the stripping tube 14 results in a general slope of material from the void former 21 at the exit end to the feed chamber 12. The removal of material at 21 and its replacement by an inert gas causes the slope; however, the irregularity of the slope is caused by the difference in volume occupied by the molten and solid zones whereby a spill over of molten material is joined with its adjacent solid zone. Joining of the slope to the feed section causes feed material to flow into the waste tube 14 intermittently thereby sustaining a continuous operation.

In the horizontal apparatus the product movement is horizontal and travels toward product flask 18 in a direction opposite to the movement of the zones. The zones travel is toward the solid liquid interface at the feed chamber; i.e., from right to left in FIGURE 4.

FIGURE 6 is an additional embodiment utilizing a combination of a vertically and horizontally disposed stripping and enriching sections, respectively, whereby a conventional void process for the vertical stripping section as described relative to FIGURES 2 A through H would take place. The horizontal enriching section would have the product movement performed as defined relative to the horizontal enriching section of FIGURE 4.

Thus, a continuous process and apparatus is provided whereby a density differential phenomenon is utilized in the enriching section to take advantage of the purer product resultant from the use of this process over that of those heretofore known. The simultaneous removal of material from the stripping and enriching sections is easily adjusted to retain a constant concentration in the feed chamber 10.

Although the previously described embodiments have been limited to a segregation coefficient of less than one and a density of the solid greater than the density of the liquid, it should be understood that the variations in these parameters are possible. For example, with the segregation coefficient greater than unity and the density of the solid greater than the density of the liquid, it should be obvious that the enriching and stripping sections described would reverse their functions since the product flow would be in the same direction as the heater movement. Other combinations of these parameters, of course, indicate minor variations of the apparatus to accommodate the changes in properties caused by the different parameters. Thus, it will be understood to those skilled in the art that the invention is capable of a variety of alternative embodiments within the spirit and scope of the appended claims.

We claim:

1. A continuous process for separating ingredients from a fusible material having its density in the solid phase greater than the density in the liquid phase comprising causing alternately spaced relatively hot and cold zones to progress along a stripping container of said material, said material being in a liquid phase at the hot zones and in a solid phase at the cold zones, inserting a volume of gas in an outlet end of said container corresponding to the amount of material melted at the said outlet of said container when a hot zone is at said outlet, the progression of said heaters causing at least one ingredient to move toward said outlet and at least one other ingredient to move toward the end of said container opposite said outlet, said movement of said zones also causing movement of said volumes of gas from said outlet to said other end of said container; causing alternately spaced relatively hot and cold zones to progress along an enriching container oriented with respect to said stripping container at an angle equal to an integral of 90° and containing said material to cause movement of said material along said enriching container in a direction opposite to zone movement, said zone movement causing the ingredients of said fusible material to travel in opposite directions in said enriching container; removing at least one of said ingredients from an outlet in the uppermost portion of said enriching container and at least one other of said ingredients from said stripping container; mixing the ingredients from the ends of said containers opposite said outlets; and mixing additional material with said previously mixed material to compensate for the amount of ingredients removed from said outlets.

2. A process for separating ingredients in a fusible material comprising separating said ingredients in each of a pair of containers, the separation in one of said containers being performed by zone-void purification, the separation in the other of said containers being performed by zone purification without the creation of voids and utilizing matter transport by the density differential phenomenon wherein the density of the solid phase is greater than the density of the liquid phase, removing at least one of the ingredients from one end of said one of said containers, removing at least one other of said ingredients from the uppermost portion of one end of said other of said containers, mixing the material rejected from the ends of said containers from which said ingredients are not removed, and adding fresh material to said material from said last-mentioned ends of said containers in an amount equal to that removed from said containers.

3. Apparatus for separating the ingredients of a fusible material comprising a pair of containers oriented with respect to one another by an integral of 90°, a feed chamber connected to one end of each of said containers, a void former at the other end of only one of said containers, means for heating the material in said feed chamber, means for heating said void former at predetermined intervals, means for heating the end of the other of said containers opposite its feed end, the other of said containers having its outlet at the highest point of said container, and means along said containers for causing alternatively hot and cold zones within said containers, and means for moving said last-mentioned means along said containers.

4. Apparatus as defined in claim 3 including a mass within said feed chamber for stirring the material therein.

5. Apparatus as defined in claim 3 wherein said containers are hollow and have a rod extending between both ends thereof.

6. Apparatus as defined in claim 3 wherein said containers are oriented in a vertical plane and are offset from each other.

7. Apparatus as defined in claim 3 wherein said containers lie in a substantially horizontal plane.

8. Apparatus as defined in claim 3 wherein one of said containers lies in a horizontal plane while the other of said containers lies in a vertical plane.

References Cited by the Examiner

UNITED STATES PATENTS 2,739,045   3/1956   Pfann _____ 23—223.5

OTHER REFERENCES

Zone Refining by Pfann, 1958, John Wiley and Sons, Inc., New York, pages 46 to 50, 116 to 150.

NORMAN YUDKOFF, *Primary Examiner.*

GEORGE D. MITCHELL, ANTHONY SCIAMANNA,
*Examiners.*

A. J. ADAMCIK, G. HINES, *Assistant Examiners.*